(12) United States Patent
Das et al.

(10) Patent No.: US 12,212,654 B2
(45) Date of Patent: Jan. 28, 2025

(54) SYSTEMS, METHODS, AND APPARATUSES FOR INFORMATION ISOLATION USING A DISTRIBUTED LEDGER ACCESSIBLE BY A CLOUD BASED COMPUTING ENVIRONMENT

(71) Applicant: Salesforce, Inc., San Francisco, CA (US)

(72) Inventors: Shakti Das, Hyderabad (IN); Shipra Shreyasi, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 985 days.

(21) Appl. No.: 16/160,953

(22) Filed: Oct. 15, 2018

(65) Prior Publication Data

US 2020/0119906 A1 Apr. 16, 2020

(51) Int. Cl.
*H04L 9/06* (2006.01)
*H04L 9/00* (2022.01)
*H04L 9/08* (2006.01)
*H04L 9/32* (2006.01)

(52) U.S. Cl.
CPC .............. *H04L 9/0637* (2013.01); *H04L 9/50* (2022.05); *G06Q 2220/10* (2013.01); *H04L 9/0894* (2013.01); *H04L 9/3239* (2013.01); *H04L 9/3297* (2013.01); *H04L 2209/56* (2013.01)

(58) Field of Classification Search
CPC ............. G06Q 50/182; G06Q 2220/10; H04L 9/0637; H04L 2209/38; H04L 2209/56
USPC ........................................................ 705/51
See application file for complete search history.

(56) References Cited

U.S. PATENT DOCUMENTS

| | | | | |
|---|---|---|---|---|
| 11,334,856 | B2* | 5/2022 | Vukich | G06Q 20/3827 |
| 2007/0282987 | A1* | 12/2007 | Fischer | G06Q 10/10 |
| | | | | 709/223 |
| 2015/0264152 | A1* | 9/2015 | Vlachogiannis | G06F 9/46 |
| | | | | 709/213 |
| 2017/0250972 | A1* | 8/2017 | Ronda | H04L 9/0891 |
| 2018/0204191 | A1* | 7/2018 | Wilson | H04L 9/30 |
| 2018/0225640 | A1* | 8/2018 | Chapman | G06Q 20/401 |
| 2019/0034889 | A1* | 1/2019 | Brock | G06Q 20/20 |
| 2019/0287199 | A1* | 9/2019 | Messerges | H04L 51/18 |
| 2019/0327079 | A1* | 10/2019 | Nandakumar | H04L 9/006 |

* cited by examiner

*Primary Examiner* — Mohammad A. Nilforoush
*Assistant Examiner* — Wodajo Getachew
(74) *Attorney, Agent, or Firm* — Polygon IP, LLP

(57) ABSTRACT

Systems, methods, and apparatuses for isolating information from a cloud services provider hosting an enterprise application software, using a distributed ledger. For example, according to one embodiment there is a system having at least a processor and a memory therein executing within a host organization to host an enterprise application software for an enterprise, receive information input from a customer of the enterprise at a user interface for the enterprise application software, transfer the customer-provided information to a distributed ledger accessible to the system, receive information input from the enterprise at an enterprise interface for the enterprise application software, transfer the enterprise-provided information to the distributed ledger accessible to the system, but maintain no copy of the customer-provided information nor copy of the enterprise-provided information in a permanent store accessible to the system and the host organization.

24 Claims, 12 Drawing Sheets

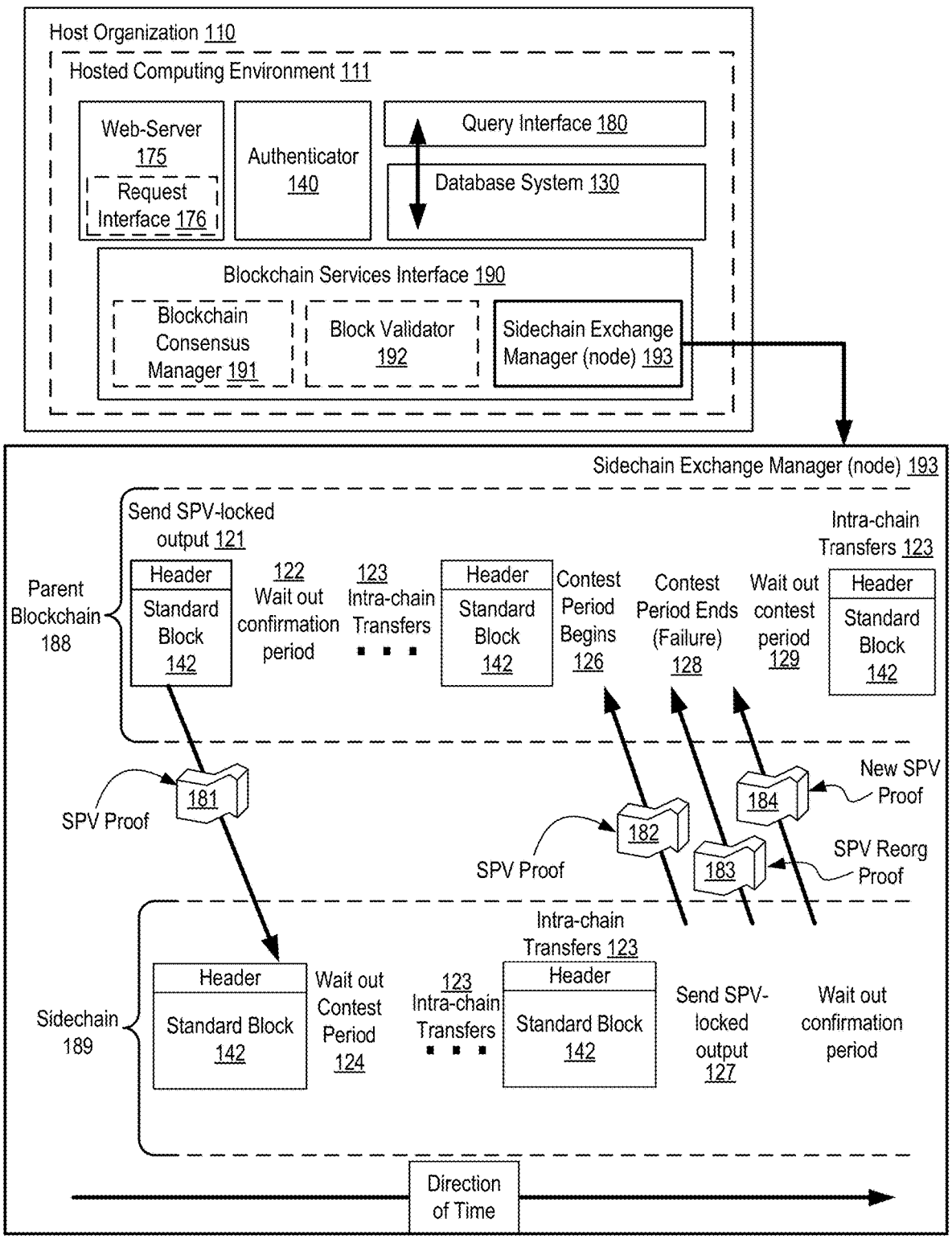

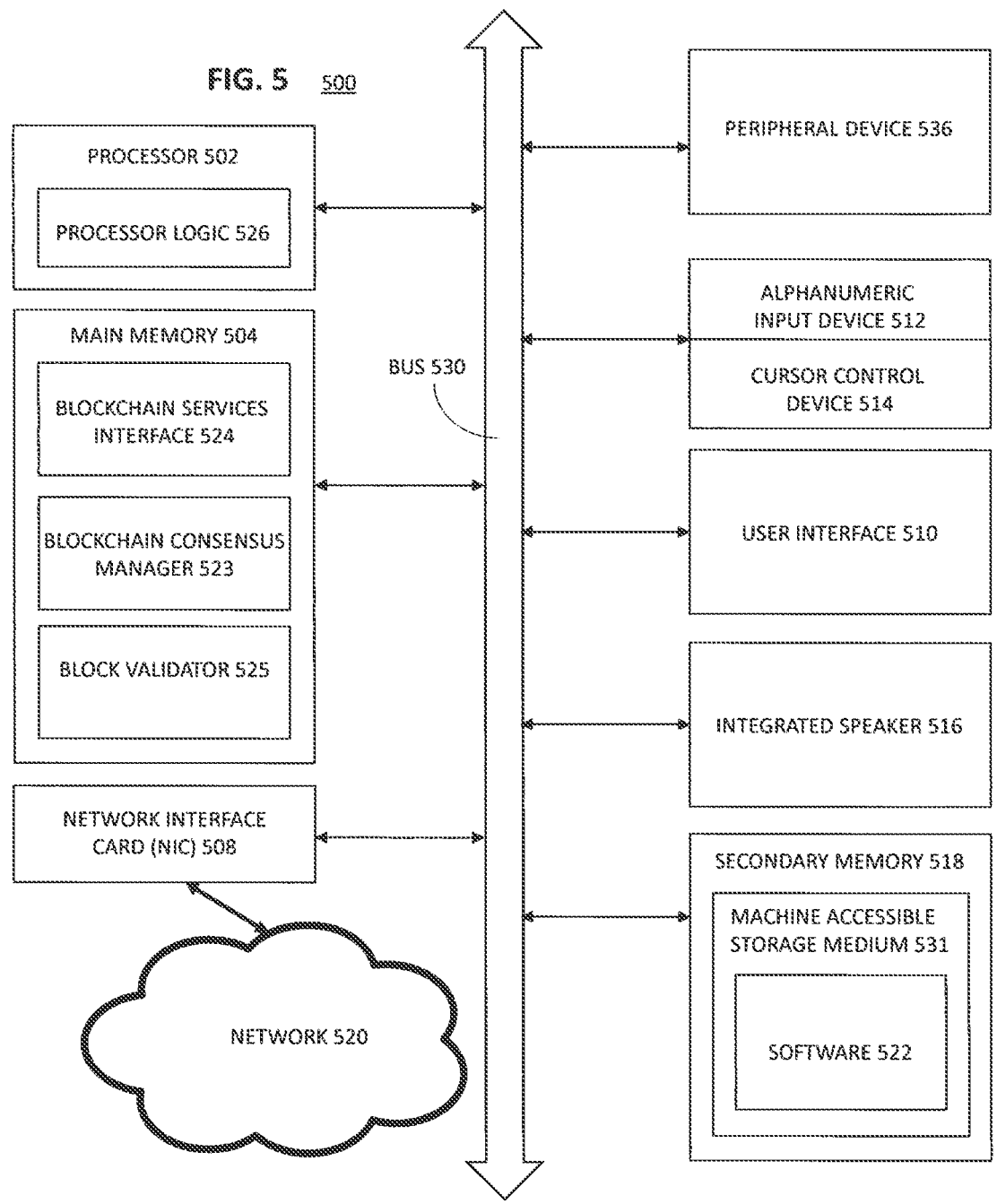

SYSTEMS, METHODS, AND APPARATUSES FOR INFORMATION ISOLATION USING A DISTRIBUTED LEDGER ACCESSIBLE BY A CLOUD BASED COMPUTING ENVIRONMENT

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of distributed ledger technology. More particularly, disclosed embodiments relate to systems, methods, and apparatuses for implementing isolation of information, using distributed ledger technology, for information exchanged between an enterprise and a customer of the enterprise via an enterprise application software hosted by a cloud-based computing services provider, such that the cloud computing services provider, and, optionally, selected agents or departments of the enterprise, cannot access the exchanged information.

BACKGROUND

The subject matter discussed in the background section should not be considered prior art merely because of its mention in the background section. Similarly, a problem mentioned in the background section or associated with the subject matter of the background section should not be considered to have been previously recognized in the prior art. The subject matter in the background section merely represents different approaches, which in and of themselves, may also correspond to claimed embodiments.

In modern financial systems, assets such as currencies, or securities, are typically held and traded electronically. Transferring assets often requires point-to-point interaction between multiple intermediaries, and reconciliation of duplicated ledgers. This system has some disadvantages, such as the time required for settlement of asset transfers or payments, which often takes days, transfers involve fee payments to multiple intermediaries, and reconciliation can involve expensive overhead, it may be difficult to find out the status of a pending transfer or the current owner of an asset, transfers may not complete, and it may be difficult to make one transfer conditional on another, the complexity of the such systems makes it difficult to prevent fraud or theft, and, whether transactions are reversible depends on the transfer mechanism, rather than the business requirements of the transacting party.

Many of these problems can be fixed if asset ownership were recorded on a single shared ledger. However, a combination of practical and technological constraints have made such ledgers difficult to adopt. Such a shared ledger would tend to require trust in a single party. That party would need to have the technical capacity to process every transaction in real time. Additionally, to address the disadvantages discussed above, the ledger would need to support more sophisticated logic than simple ownership changes. In 2009, a person or group of persons operating under the pseudonym Satoshi Nakamoto introduced Bitcoin, the first implementation of a protocol that enables issuance of a digital bearer instrument without a trusted third party, using a distributed ledger technology, in particular, an electronic ledger replication system known as a blockchain. Bitcoin solves the problem of implementing decentralized digital cash, but its security model limits its efficiency and throughput, its design only supports a single asset, and its virtual machine has only limited support for custom programs that determine asset movement, sometimes called smart contracts.

Ethereum, introduced in 2015, generalizes the concept of a blockchain to a fully programmable state replication mechanism. While it includes a much more powerful programming language, it presents additional challenges for scalability and efficiency.

In contrast to Bitcoin and Ethereum, which are designed to operate on the public Internet, most financial activity or activity involving sensitive data already occurs within restricted networks of financial institutions or other institutions. A shared ledger operated within this network can take advantage of distributed ledger, e.g., blockchain, technology without sacrificing the efficiency, security, privacy, and flexibility needed by these institutions.

The present state of the art may therefore benefit from the systems, methods, and apparatuses for improving upon, modifying, and expanding upon distributed ledger technologies and providing such capabilities via an on-demand cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1D depicts another exemplary architecture with additional detail for sidechains, in accordance with described embodiments;

FIG. 5 illustrates a diagrammatic representation of a machine in the exemplary form of a computer system, in accordance with one embodiment.

DETAILED DESCRIPTION

Figure 1A:
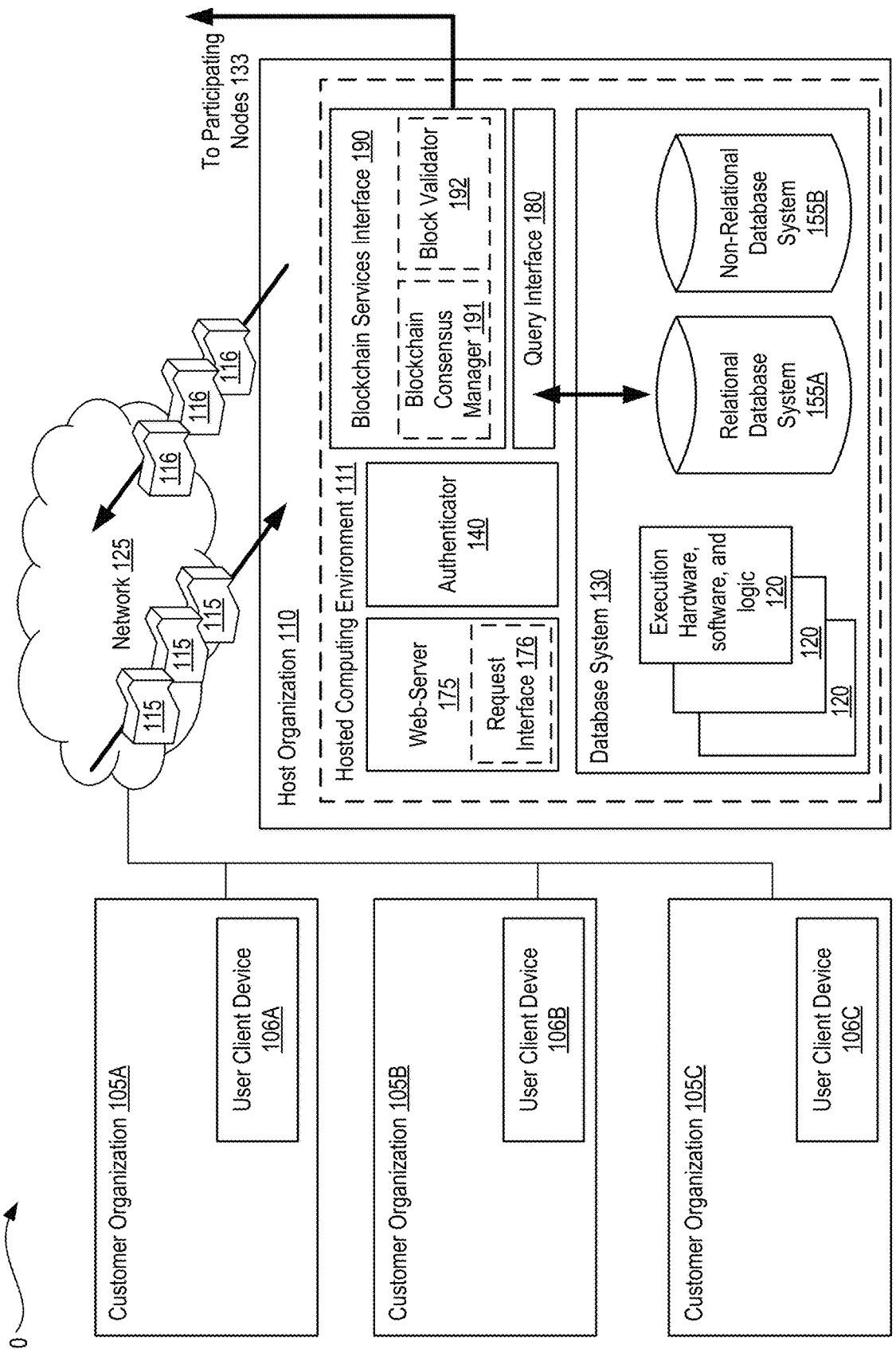
FIG. 1A depicts an exemplary architecture in accordance with described embodiments.

Described herein are systems, methods, and apparatuses for implementing distributed ledger technology in a cloud based computing environment. The distributed ledger technology provides for isolation of information exchanged between an enterprise and a customer of the enterprise via an enterprise application software hosted by a cloud-based computing services provider, such that the cloud-based computing services provider, and, optionally, selected agents or departments of the enterprise, cannot access the exchanged information.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records comprising user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 150 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 150 of the database system 130 are separate and distinct from the customer organizations (105A, 105B, and 105C) which utilize web services and other service offerings as provided by the host organization 110 by communicably interfacing to the host organization 110 via network 155. In such a way, host organization 110 may implement on-demand services, on-demand database services or cloud computing services to subscribing customer organizations 105A-C.

Further depicted is the host organization 110 receiving input and other requests 115 from customer organizations 105A-C via network 155 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 155 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is the blockchain services interface 190 having included therein both a blockchain consensus manager 191 and a block validator 192. Blockchain services interface 190 communicatively interfaces the host organization 110 with other participating nodes 133 (e.g., via the network 155) so as to enable the host organization 110 to participate in available blockchain protocols by acting as a blockchain protocol compliant node so as to permit the host organization 110 to access information within such a blockchain as well as enabling the host organization 110 to provide blockchain services to other participating nodes 133 for any number of blockchain protocols supported by, and offered to customers and subscribers by the host organization 110.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system can be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high Byzantine fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 190, is merely one of many nodes for an available blockchain protocol or operates as blockchain protocol manager and provider, while other participating nodes 133 communicating with the host organization 110 via blockchain services interface 190 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers can exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing it, blockchain makes data transparent to everyone involved.

Every participating node 133 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 133 are trusted more than any other, although this default may be altered via certain specialized blockchain protocols as will be described in greater detail below. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority should be considered a blockchain. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless, of the semantics, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110.

An advantage to an open, permissionless, or public, blockchain network is that guarding against bad actors is not required and no access control is needed. This means that applications can be added to the network without the approval or trust of others, using the blockchain as a transport layer. Conversely, permissioned (e.g., private) blockchains use an access control layer to govern who has access to the network. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

Figure 1B:
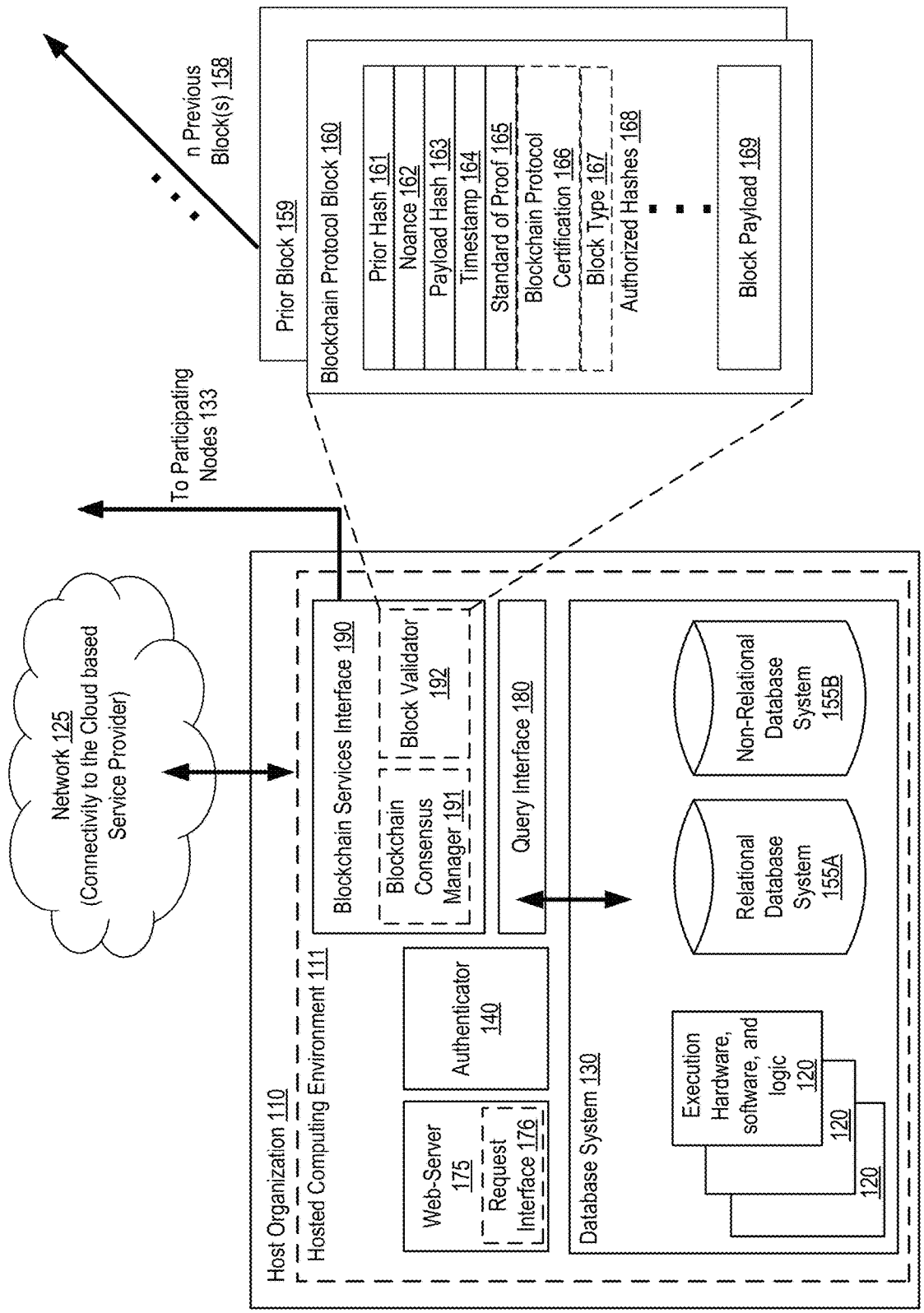
FIG. 1B depicts another exemplary architecture, with additional detail of a blockchain protocol block 160, in accordance with described embodiments.

FIG. 1B depicts another exemplary architecture 101, with additional detail of a blockchain protocol block 160, in accordance with described embodiments.

In particular, a blockchain protocol block 160 is depicted here to be validated by the block validator 192 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 190.

In accordance with a particular embodiment, the blockchain protocol block 160 depicted here defines a particular structure for how the fundamental blocks of any given blockchain protocol supported by the host organization 110 is organized.

The prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment the non-reversible mathematical computation utilized is a SHA256 hash function, although other hash functions may be utilized. According to such an embodiment, the hash function results in any change to data in the prior block 159 or any of the n previous blocks 158 in the chain, causing an unpredictable change in the hash of those prior blocks, and consequently, invalidating the present or current blockchain protocol block 160. Prior hash 161 creates the link between blocks, chaining them together to form the current blockchain protocol block 160.

When the block validator 192 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 163 provides a hash of the data stored within the block payload 169 portion of the blockchain protocol block 160 and need not meet any specific standard of proof 165. However, the payload hash is included as part of the input when the hash is calculated for the purpose of storing as the prior hash 161 for the next or subsequent block. Timestamp 164 indicates what time the blockchain protocol block 160 was created within a certain range of error. According to certain blockchain protocol implementations provided via the blockchain services interface 190, the distributed network of users (e.g., blockchain protocol nodes) checks the timestamp 164 against their own known time and will reject any block having a time stamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 190, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized to store other information relevant to the reading, accessing, and correct processing and interpretation of the block payload 169.

Block payload 169 data stored within the block may relate to any number of a wide array of transactional data depending on the particular implementation and blockchain protocol utilized, including payload information related to, for example, financial transactions, ownership information, data access records, document versioning, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, will be utilized as at least part of the input for the hash that produces the payload hash 163.

Various standard of proofs 165 may utilized pursuant to the particular blockchain protocol chosen, such as proof of work, hash value requirements, proof of stake, a key, or some other indicator such as a consensus, or proof of consensus. Where consensus based techniques are utilized, the blockchain consensus manager 191 provides consensus management on behalf of the host organization 110, however, the host organization 110 may be operating only as one of many nodes for a given blockchain protocol which is accessed by the host organization 110 via the blockchain services interface 190 or alternatively, the host organization 110 may define and provide a particular blockchain protocol as a cloud based service to customers and subscribers (and potentially to non-authenticated public node participants), via the blockchain services interface 190. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may be all of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

Figure 1C:
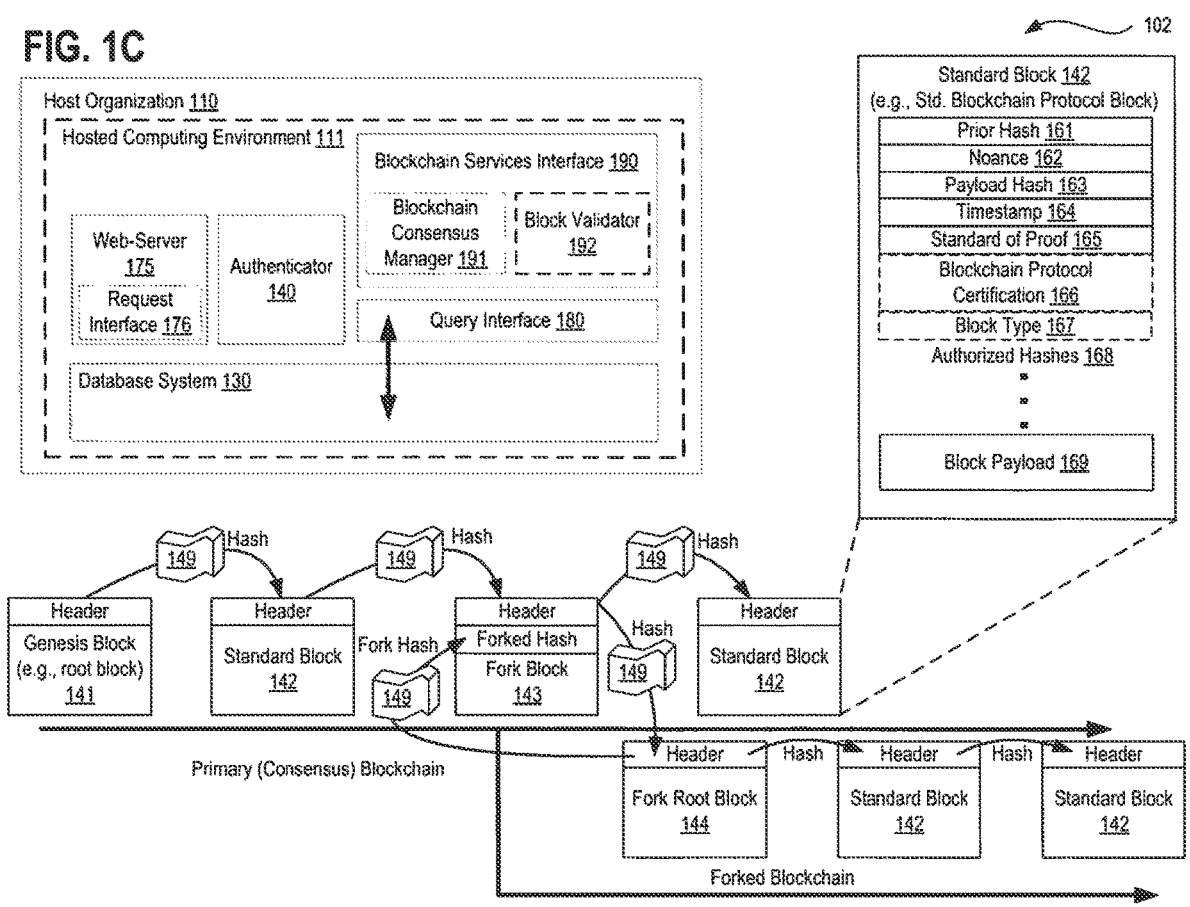
FIG. 1C depicts another exemplary architecture, with additional detail of a blockchain and a forked blockchain, in accordance with described embodiments.

FIG. 1C depicts another exemplary architecture 102, with additional detail of a blockchain and a forked blockchain, in accordance with described embodiments.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork that originates from the fork block 143. As shown here, the genesis block 141 is a special block that begins the primary blockchain and is different from the other blocks because it is the first block in the primary block chain and, therefore, cannot, by definition, include a hash of any previous block. The genesis block 141 marks the beginning of the primary blockchain for the particular blockchain protocol being utilized. The blockchain protocol governs the manner by which the primary blockchain grows, what data may be stored within, and forked blockchains are created, as well as the validity of any block and any chain may be verified via the block validator 192 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing potentially valid primary blockchains. Once consensus is reached (typically after one or two cycles and new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a returned fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which tokens, value, or payload entries from one blockchain may be securely used within a completely separate blockchain via a pre-defined exchange or conversion scheme, and yet, be permissibly moved back to the original chain, if necessary. By convention the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft .Net, C++, C#, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

FIG. 1D depicts another exemplary architecture 103 with additional detail for sidechains, in accordance with described embodiments.

More particularly, there is depicted here mechanism by which to perform a symmetric two-way pegged transfer from a parent blockchain 188 (e.g., e.g., a primary chain) to a sidechain 189, which may be a different blockchain protocol supported by and provided by the host organization 110 or the sidechain may be a foreign blockchain, public or private, for which the sidechain exchange manager 193 of the host organization 110 participates as a node, so as to permit access and transactional capabilities with the sidechain. Regardless, it is in accordance with described embodiments that inter-chain transfers between the parent blockchain 188 and the sidechain 189 may permissibly performed in compliance with the rules and conditions of each respective blockchain. Notably, as described here, the perspective of each blockchain is interchangeable insomuch that the sidechain 189 depicted here may consider itself as a primary or parent blockchain and consider the depicted parent blockchain 188 as the child blockchain or a sidechain. Regardless, each blockchain operates independently, yet has a defined exchange mechanism by which to exchange tokens, value, or other payload information between them.

As shown here, the sidechain exchange manager 193 of the host organization may send a parent chain asset as an output of the parent blockchain 188 at operation 151.

A Simplified Payment Verification (SPV) proof 181 associated with the parent blockchain 188 asset is generated as the output and communicated to the sidechain 189. The SPV proof may include a threshold level of work, and the generating may take place over a predetermined period of time, which may also be referred to as a confirmation period 152. The confirmation period of a transfer between chains may be a duration for which a coin, token, or other exchanged value is locked on the parent blockchain 188 before may successfully be transferred to the sidechain 189. This confirmation period may allow for sufficient work to be created such that a denial of service attack in the next waiting period becomes more computationally difficult.

Consider for instance an exemplary confirmation period which may be on the order of 1-2 days. The confirmation period may be implemented, in such an example, as a per-sidechain security parameter, which trades off cross-chain transfer speeds in exchange for greater security. Other confirmation periods which are much shorter may be utilized where sufficiently difficult proof of work conditions are effectuated so as to ensure adequate security so as to protect the integrity of both blockchains and negate the potential for fraudulent transactions.

The output created on the parent blockchain 188 may specify via rules and configuration parameters (e.g., stored within the blockchain protocol certification portion of each block of the parent blockchain 188) a requirement that any spending, transfer, or consumption of an asset received by the output in the future are burdened with additional conditions, in addition to the rules governing transfer within the parent chain. For example, any release of assets received by the output may require additional conditions for verifying a proof from the destination chain, such as validating that the rules for the destination chain proof show that the destination chain has released the asset and show to where the asset has been released. After creating the output on the parent blockchain 188, the user waits out the confirmation period, meanwhile, intra-chain transfers 153 continue to occur. Subsequent to waiting out the confirmation period, a transaction is then created on the sidechain 189 referencing the output from the parent blockchain 188.

The sidechain, using a sidechain validator service, such as the block validator 192 of the host organization, is then provided with an SPV proof that shows the parent chain asset was created and encumbered by sufficient work within the parent chain. A sidechain validator service (e.g., block validator 192 if performed by the host organization's available services) will then validate that the SPV proof associated with the parent blockchain 188 asset meets the required threshold level of work indicated by the SPV proof at operation 154 and a sidechain 189 asset corresponding to the parent blockchain 188 asset is then generated.

The generated sidechain 189 asset also may be held for a predetermined contest period at operation 154, during which time the transfer will be invalidated if a reorganization proof 183 associated with the parent blockchain 188 asset is detected in the parent blockchain.

The contest period at operation 154 may be a duration during which a newly-transferred token, coin, value, or payload data may not be spent, accessed, or consumed on the sidechain 189. The predetermined contest period is implemented to prevent any possibility for double-spending in the parent blockchain 188 by transferring previously-locked coins, tokens, value, or payload data during a reorganization. If at any point during this delay, a new SPV proof 184 (known as a "reorganization proof") is published containing a chain with more aggregate work which does not include the block in which the lock output was created, the conversion is retroactively invalidated. If no reorganization proof is detected, the sidechain asset may be released. All participating nodes on the sidechain have an incentive to produce reorganization proofs if possible, as the consequence of a bad proof being admitted degrades the value of all sidechain tokens, coins, value, or trust in the authenticity of payload data stored by the sidechain 189.

Similar to the above, an exemplary contest period at operation 156 may also be on the order of 1-2 days. To avoid these delays, users may instead employ use atomic swaps for fungible transfers, so long as a liquid market is available. Where the exchanged asset is a unique or less common token, value, or payload data, atomic swaps will not be feasible and a sidechain transfer must instead occur, despite the necessity of a potentially lengthy 1-2 day waiting period.

Upon eventual release of the sidechain asset, the side chain asset corresponding to the parent chain asset may then be transferred or consumed within the sidechain one or more times the intra-chain transfers 153 of the sidechain 189.

While locked on the parent blockchain 188, the asset is freely transferable within the sidechain and without requiring any further interaction with the parent blockchain 188, thus permitting the sidechain 189 to again operate wholly independently. Notwithstanding the above, the sidechain asset retains its identity as a parent chain token, coin, value, or payload data and may therefore, if the need arises, be transferred back to the originating parent blockchain 188 from which the sidechain asset originated. In certain embodiments, transfers are relegated to only a single hop, such that an asset cannot be transferred to a sidechain 189 and then transferred again to another sidechain, where it is necessary to prevent obfuscation of the source. Such restrictions are dependent upon the particular blockchain protocol chosen and the define exchange agreement (e.g., pegging conditions) established between a parent blockchain 188 and a sidechain 189.

Where it becomes necessary to redeem a sidechain asset in the parent blockchain 188, the sidechain asset may be sent to an output of the sidechain as depicted at operation 157. An SPV proof 182 associated with the sidechain asset is thus generated and communicated to the parent blockchain 188. A parent chain validator service, such as the block validator 193 of the host organization 110, may validate the SPV proof 182 associated with the sidechain asset at operation 156. The validated the SPV proof 182 associated with the sidechain 189 asset may include, for example, validation that the SPV proof 182 associated with the sidechain asset meets the threshold level of work indicated by the SPV proof 182 associated with the sidechain asset.

As before, the parent chain asset associated with the sidechain asset may be held for a second predetermined contest period at step 156, during which a release of the parent chain asset is denied at operation 158 if a reorganization proof 183 associated with the sidechain asset is detected in the sidechain. The parent chain asset may be released if no reorganization proof 183 associated with the sidechain asset is detected.

If validation failure occurs with respect to the second SPV proof 184, after the reorganization proof 183 is received, then a second SPV proof 184 associated with the sidechain asset may be received and validated by the parent blockchain 188 during a third predetermined contest period at operation 159. The parent blockchain 188 asset may be released if no reorganization proof associated with the sidechain asset is detected during the third predetermined contest period, after which the parent chain asset is free to be transferred within the parent chain via the depicted intra-chain transfers 153 shown at the rightmost side of the parent blockchain 188 flow.

Because pegged sidechains may carry assets from many different blockchains, it may be problematic to make assumptions about the security of the other foreign blockchains. It is therefore required in accordance with certain embodiments that different assets are not interchangeable (except by an explicit trade) within the sidechain. Otherwise, a malicious user may potentially execute a fraudulent transaction by creating a worthless chain with a worthless asset, and then proceed to move the worthless asset from their worthless chain into the primary blockchain 188 or into a sidechain 189 with which the primary blockchain 188 interacts and conducts exchanges. This presumes that the worthless chain secures a pegged exchange agreement with the sidechain. However, because the rules, configuration options, and security scheme of the sidechain 189 is not controlled by the parent blockchain 188 (assuming the sidechain is a foreign sidechain and not another blockchain protocol provided by the host organization 110), it simply cannot be known with certainty that the sidechain 189 being interacted with does not contain such vulnerabilities. To negate this potential security vulnerability, the sidechain 189 may be required, as per the pegged exchange agreement, to treat assets from separate parent blockchains as wholly as separate asset types, as denoted by the block type portion of a blockchain protocol block as depicted at FIG. 1B, element 167.

With a symmetric two-way pegged sidechain transfer, both the parent blockchain 188 and sidechains 189 may perform SPV validation services of data on each other, especially where the parent blockchain 188 is provided the host organization and where the sidechain is a foreign sidechain for which the host organization is merely a participating node via the sidechain exchange manager node 193. Because the parent blockchain 188 clients (e.g., participating nodes) do not observe every sidechain, users import proofs of work from the sidechain into the parent chain in order to prove possession. In a symmetric two-way peg, the reverse is also true. For example, to use Bitcoin as a parent blockchain 188, an extension script to recognize and validate such SPV proofs may be utilized. To facilitate such transactions, the SPV proofs should be sufficiently small in size so as to fit within a Bitcoin transaction payload. However, such a change may alternatively be implemented as a forking transaction, as described previously, without affecting transactions not involved in pegged sidechain transactions. Stated differently, using symmetric two-way pegged sidechains as described above, no further restrictions would necessarily be placed upon any transaction deemed valid within Bitcoin.

Through the use of such pegged sidechains transactions, independent blockchains are made to be flexible enough to support many assets, including assets that did not exist when the chain was first created. Each of these assets may be labeled with the blockchain from which it was transferred so as to ensure that transfers can be unwound (e.g., transferred back) correctly.

According to certain embodiments, the duration of the contest period could be made as a function of the relative hashpower of the parent chain and the sidechain, such that the receiving sidechain (or the parent blockchain with an incoming transfer) may only unlock tokens, coins, value, or data payloads, given an SPV proof of one day's worth of its own proof-of-work, which may, for example, correspond to several days of the sending blockchain's proof-of-work. Security parameters of the particular sidechain's blockchain protocol implementation may thus be tuned to each particular sidechain's implementation.

Distributed ledger technology, according to embodiments of the invention, is implemented on a hosted blockchain platform based on one or more blockchain framework implementations, including tools for building blockchain business networks and blockchain based applications. The hosted blockchain platform may provide Blockchain as a Service (BaaS) to customers of a cloud based computing environment service provider, such as the assignee of the present patent application, so that the customers do not have to configure and set up a working blockchain and consensus models, including the attendant hardware and software. The described methods may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 111, its database system 130 as depicted at FIG. 1A, et seq., and other systems and components as described herein may implement the described methodologies. Some of the logic blocks and/or operations listed below are optional in accordance with certain embodiments. The numbering of the logic blocks presented is for the sake of clarity and is not intended to prescribe an order of operations in which the various logic blocks must occur.

Some embodiments of the invention may operate in connection with a permissioned, or private, blockchain-based distributed ledger technology. In one embodiment, a consortium of nodes participate in the permissioned blockchain, wherein each node is operated on or by a different party in the consortium. For example, the consortium might include one or more banking or financing institutions, or insurance companies. In any case, the consortium members each communicate via their respective node with other members of the consortium to add and/or verify assets and/or transactions involving the assets to the permissioned blockchain.

In one embodiment, the nodes have access to a data store, such as a database, an on-demand database service, or a distributed database system, that maintains information about the types of assets and/or transactions that may be committed to the permissioned blockchain, herein below sometimes referred to as the transaction type database. In addition, the data store optionally associates a consensus protocol or consensus protocol type with each transaction type. In one embodiment, one or more nodes maintains the database, while other nodes merely have read access to the database. In other embodiment, a blockchain-based distributed ledger platform host executing on, for example, an application server or cluster of application servers in a cloud computing service provider's cloud computing system, may set up and maintain the database, for example, as part of a Blockchain-as-a-Service (BaaS) application supported by the cloud computing service provider. In such an embodiment, the database is accessible to the application server(s), and the nodes in the consortium access the database by sending requests to, and receiving responses from, the blockchain platform host. In one embodiment, one or more nodes in the consortium, each represented within or as a customer organization or community of the cloud computing service, may access the database as subscribers of the cloud computing service. In some embodiments, the information in the database may be cached by the blockchain platform host, an application server, or a cluster of application servers in a cloud computing service provider's cloud computing system, for ready read-access by or on behalf of nodes in the cloud computing environment.

When a block containing a particular asset or transaction is to be added to the blockchain, the transaction type database is queried using the type of the particular asset or transaction that is to be added to the blockchain to determine the corresponding consensus protocol type that is to be used to commit the particular asset or transaction, or block containing the particular asset or transaction, to the blockchain. For example, in the database, a transaction type of "loan" may be associated with a consensus protocol type of "proof of stake" (PoS), an asset type of "document" may be associated with a consensus protocol type of "Byzantine Fault Tolerant" (BFT), an asset or transaction type of "currency" may be associated with a consensus protocol type of "proof of work" (PoW), and a default transaction type to be used in the case of an otherwise unenumerated transaction type in the database may be associated with a default consensus protocol type, say, PoS.

Thus, continuing on with the example provided above, when a block, or transaction therein, for a particular transaction having the type "loan" is to be added to the blockchain, the consensus protocol type to be used to commit the block or transaction therein to the blockchain is, for example, PoS, when a block or transaction therein for a particular asset having the type "document" is to be added to the blockchain, the consensus protocol type to be used to commit the block or transaction therein to the blockchain is, for example, a different consensus protocol type, such as BFT, and when a block or transaction therein for a particular transaction having a transaction type that is not specified in the database is to be added to the blockchain, then the default consensus protocol type of, for example, PoS is to be used to commit the block or transaction therein to the blockchain.

Enterprise software, also known as enterprise application software (EAS), is computer software used to satisfy the needs of an organization as opposed to individual users. Such organizations include, for example, businesses, schools, interest-based user groups, governments, etc.

Services provided by enterprise software are typically business-oriented tools, such as but not limited to online shopping, online payment processing, interactive product catalogue, automated billing systems, security, business process management, enterprise content management, information technology (IT) service management, customer relationship management, enterprise resource planning, business intelligence, project management, collaboration, human resource management, and manufacturing.

As enterprises have similar departments and systems in common (e.g., HR, customer support), enterprise software is often available as a suite of customizable programs. So, enterprise software describes a collection of computer programs with common business applications, tools for modeling how the entire organization works, and development tools for building applications customized for an organization. The goal of enterprise software is to improve the enterprise's productivity and efficiency by providing business logic functionality, including the display, manipulation, and storage of large amounts of business data and automation of business processes with that data.

Enterprise application software performs business functions such as order processing, procurement, production scheduling, customer relationship management, and accounting. It is typically hosted on the organization's servers and provides simultaneous services to a large number of users, typically over a computer network. This is in contrast to a single-user application that is executed on a user's personal computer and serves only one user at a time.

Software as a service (SaaS) is a software distribution model in which a third-party provider, such as the assignee of the present invention, hosts applications such as enterprise application software and makes the applications available to customers over the Internet.

SaaS removes the need for organizations to install and run applications on their own computers or in their own data centers. This eliminates the expense of hardware acquisition, provisioning and maintenance, as well as software licensing, installation and support. Further, since SaaS applications are delivered over the Internet, users can access them from any Internet-enabled device and location.

SaaS is closely related to ASP (application service providers) and on demand computing software delivery models. The hosted application management model of SaaS is similar to ASP: a third party provider hosts a customer's software and delivers it to approved end users over the Internet. In the software on demand SaaS model, the third party services provider gives customers network-based access to a single copy of an application that the third party services provider offers specifically for SaaS distribution. Depending upon the service level agreement (SLA), a customer's data for the SaaS or ASP model may be stored locally, in the cloud, or both locally and in the cloud. Embodiments of the invention contemplate an SLA in which the customer's data is stored locally, that is, on, or accessible to, the enterprise's premises ("on premises") but is not stored in or accessible to the cloud or the third party enterprise application software service provider.

Organizations can integrate SaaS applications with their other, e.g., existing, (legacy) software using application programming interfaces (APIs). For example, a business can write its own software tools and use the SaaS provider's APIs to integrate those tools with the SaaS offering. These software tools may be considered or referred to as "back-end" software tools, including enterprise applications and databases, etc., as opposed to front-end software presented to the enterprise's customers, e.g., via a web browser accessing a user interface of enterprise application software hosted on a third party services provider's cloud-based computing environment.

SaaS or ASP pose some potential disadvantages. Businesses must rely on outside vendors to provide the software, keep that software up and running, and facilitate a secure environment for the business' data. Providers that experience service disruptions, impose unwanted changes to service offerings, experience a security breach or any other issue can have a significant negative effect on the customers' ability to use the SaaS or ASP offerings.

In particular, information relating to a workflow or transaction, for example, between an enterprise and one of its customers, may be highly sensitive or confidential, and the enterprise and/or customer may not want, or be comfortable knowing, the third party services provider hosting the enterprise application software on behalf of the enterprise has access to the workflow or transaction, or at least some information contained therein. Embodiments of the invention isolate such information from the third party services provider hosting the enterprise application software. For example, according to embodiments of the invention, a cloud-based computing services provider hosting enterprise application software on behalf of an enterprise provides for the exchange of information relating to a workflow or transaction between an enterprise and their customers in such a manner that the third party services provider does not have access to at least some portion of the information content, e.g., sensitive or confidential data (however that sensitive or confidential data is defined by the enterprise, the third party services provider, or an agreement between the enterprise and third party services provider) exchanged between the enterprise and their customers.

In another embodiment, the cloud-based computing services provider hosting enterprise application software on behalf of the enterprise provides for the exchange of information relating to a workflow or transaction between the enterprise and their customers in such a manner that selected departments, personnel, agents or contractors of the enterprise, in addition to the third party services provider, do not have access to at least some portion of the information content, e.g., sensitive or confidential data exchanged between the enterprise and their customers. For example, sensitive customer data for a financial institution may be isolated from a CRM representative handling a customer support call or chat from a customer, but not from a banker or loan officer in the financial institution.

These embodiments providing data isolation implement a distributed ledger, e.g., a private blockchain, in which to store information that only the enterprise and/or enterprise customer can access—the third party services provider is not able to access the private blockchain, even when providing the blockchain as a service for the enterprise. For example, in the case of a financial institution utilizing a cloud-based computing environment provided by a third party cloud services provider to host an enterprise application software package for the enterprise, such as a CRM system, the CRM data is securely shared between the enterprise and the customer—the third party services provider cannot see the CRM data, or selected CRM data, shared or exchanged between the enterprise and its customers. Such embodiments provide for the ability to securely connect an enterprise's customers and representatives with an on-premise system accessible to the enterprise through the cloud services provided by the third party services provider, that is, essentially, a secure connection is established between the enterprise and its customers, via which information may be exchanged by placing it in a distributed ledger that only the enterprise and one or more customers can write to and read from.

FIGS. 2A-2D depict flow diagrams illustrating, generally, a method for implementing isolation of information exchanged between an enterprise and a customer of the enterprise via an enterprise application software hosted by a cloud-based computing services provider, such that the cloud-based computing services provider, and, optionally, selected agents or departments of the enterprise, cannot access the exchanged information.

Some of the logic blocks and/or operations listed below are optional in accordance with certain embodiments. The numbering of the blocks presented is for the sake of clarity and is not intended to prescribe an exact order of operations in which the various blocks must occur.

Figure 2A:
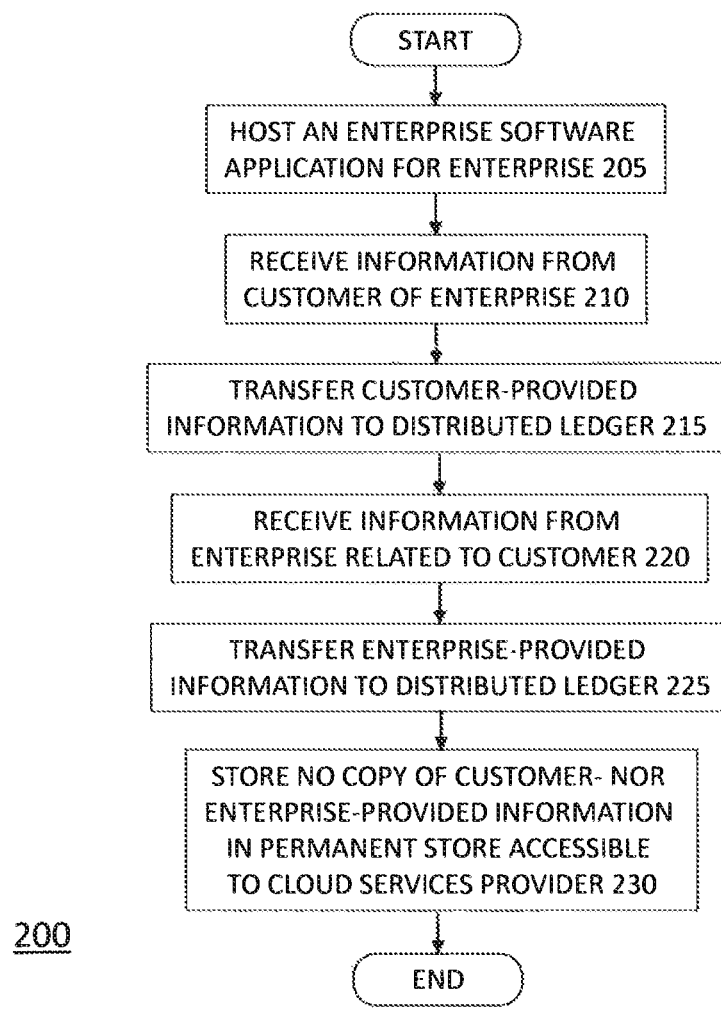
FIG. 2A depicts a flow diagram illustrating a method for implementing a distributed ledger technology method to isolate enterprise data from a cloud-based computing services provider that hosts a corresponding enterprise application software, in accordance with described embodiments.

According to an embodiment of the invention, with reference to the method 200 depicted at FIG. 2A, at block 205, processing logic is performed by a system in a host organization operated by a cloud computing services provider, or, alternatively, an application services provider. The system has at least a processor and a memory therein and hosts enterprise application software for an enterprise. The enterprise is a customer of the cloud computing services provider according to an embodiment.

At block 210, processing logic receives information input from a customer of the enterprise at a user interface for the enterprise application software. For example, the customer may be accessing a user interface of the enterprise application hosted by the cloud computing services provider. The user interface may be presented at a particular URL address accessed via a web browser executing on a client device accessible to the customer. Alternatively, a customer services representative or agent of, or contractor for, the enterprise may be communicating with the enterprise via the user interface on behalf of the customer. The customer services representative may, in turn, be in communication with the customer via other means, e.g., telephone or mobile phone communication, video conference, web chat, text messaging, social media platform communication or messaging, etc.

At block 215, the customer-provided information is transferred to a distributed ledger accessible to the system. In one embodiment, the distributed ledger is provided, maintained, and operated by the third party services provider. In another embodiment, the distributed ledger is maintained and operated by a separate distributed ledger services provider, coupled in electronic communication with the third party enterprise application software services provider. In one embodiment, selected information provided by the customer is transferred to the distributed ledger, whereas other information need not be, depending on the nature and status of the information provided by the customer. For example, the enterprise application software may designate certain information input by the customer as sensitive data, that when received, is tagged or otherwise marked as such, and transferred to the distributed ledger. Importantly, this information is not stored in a permanent store accessible to the third party services provider, such as the provider's cloud database(s).

Likewise, at block 220, processing logic receives information input from the enterprise at an enterprise interface for the enterprise application software. For example, enterprise software on-premises may be accessing an API between the enterprise application hosted by the cloud computing services provider, and provide the information via the API. Alternatively, or additionally, an employee or agent of the enterprise may access the enterprise application software hosted by the third party services provider and provide information to it in the same manner as the customer, that is, the system's processing logic can receive information input from an enterprise employee at a user interface for the enterprise application software. For example, the enterprise employee may be accessing the user interface of the enterprise application hosted by the cloud computing services provider. The user interface may be presented at a particular URL address accessed via a web browser executing on a client device accessible to the enterprise employee. Alternatively, a customer services representative, or third party contractor, for the enterprise may access the enterprise application software hosted by the third party services provider and provide information to it in the same manner as the employee or agent.

At block 225, the enterprise-provided information is transferred to the distributed ledger accessible to the system. In one embodiment, selected information provided by the enterprise is transferred to the distributed ledger, whereas other information need not be, depending on the nature and status of the information provided by the enterprise. For example, the enterprise application software may designate certain information input by the enterprise as sensitive data, that when received, is tagged or otherwise marked as such, and transferred to the distributed ledger. At block 230, this information, just like the customer-provided information, is not stored in a permanent store accessible to a system or host organization operated by the third party services provider, such as the enterprise application software host provider's cloud database(s).

Figure 2B:
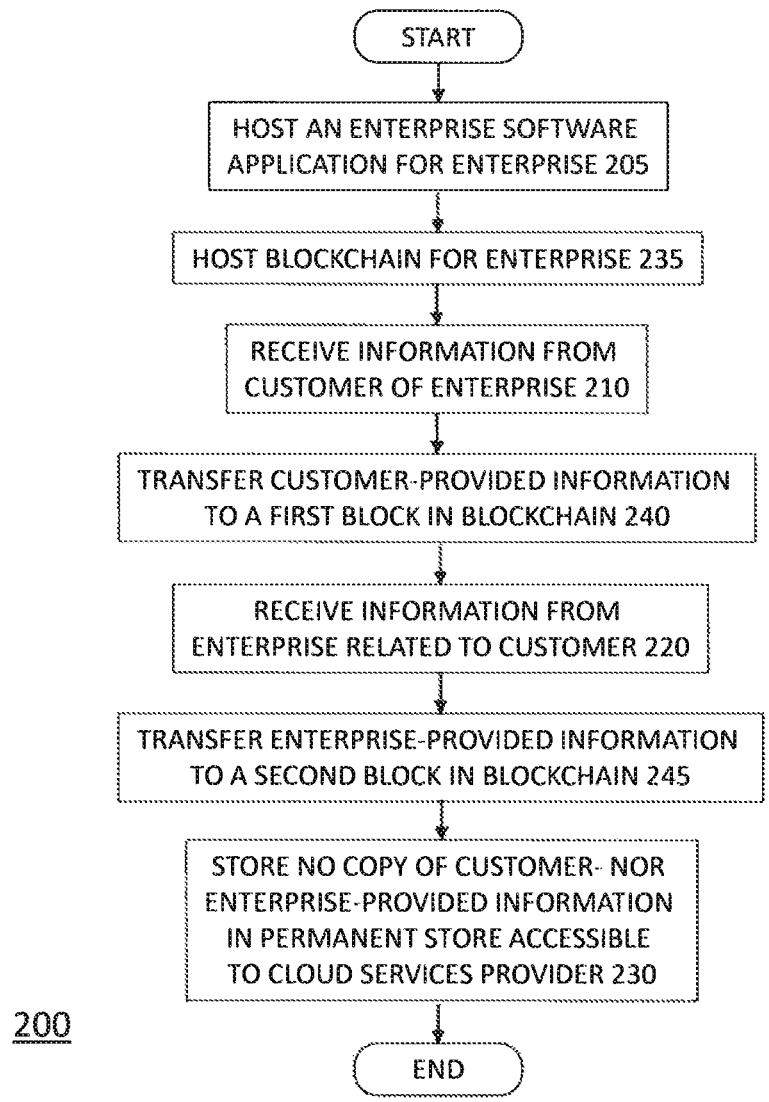
FIG. 2B depicts a flow diagram illustrating a method for implementing a distributed ledger technology method to isolate enterprise data from a cloud-based computing services provider that hosts a corresponding enterprise application software, in accordance with described embodiments.

According to another embodiment, with reference to the method 200 depicted at FIG. 2B, at block 205, processing logic is performed by a system in a host organization operated by a cloud computing services provider, or, alternatively, an application services provider. The system has at least a processor and a memory therein and hosts enterprise application software for an enterprise that is a customer of the cloud computing services provider.

At block 235, the third party services provider hosts a blockchain as a service for its customers, so that, at block 240, after the processing logic receives information input from a customer of the enterprise at a user interface for the enterprise application software, as described above with reference to block 210, the customer-provided information is transferred to a block in the blockchain accessible to the system. In one embodiment, selected information provided by the customer is transferred to a first block in the blockchain, whereas other information need not be, depending on the nature and status of the information provided by the customer. For example, the enterprise application software may designate certain information input by the customer as sensitive data, that when received, is tagged or otherwise marked as such, and transferred to the first block in the blockchain. Importantly, this information is not stored in a permanent store accessible to the third party services provider, such as the provider's cloud database(s).

Likewise, at block 245, after processing logic receives information input from the enterprise at an enterprise interface for the enterprise application software, as described above with respect to block 220, the enterprise-provided information is transferred to a second block in the blockchain accessible to the system. In one embodiment, selected information provided by the enterprise is transferred to the second block, whereas other information need not be, depending on the nature and status of the information provided by the enterprise. For example, the enterprise application software may designate certain information input by the enterprise as sensitive data, that when received, is tagged or otherwise marked as such, and transferred to the second block. At block 230, this information, just like the customer-provided information, is not stored in a permanent store accessible to a system or host organization operated by the third party services provider, such as the enterprise application software host provider's cloud database(s).

Figure 2C:
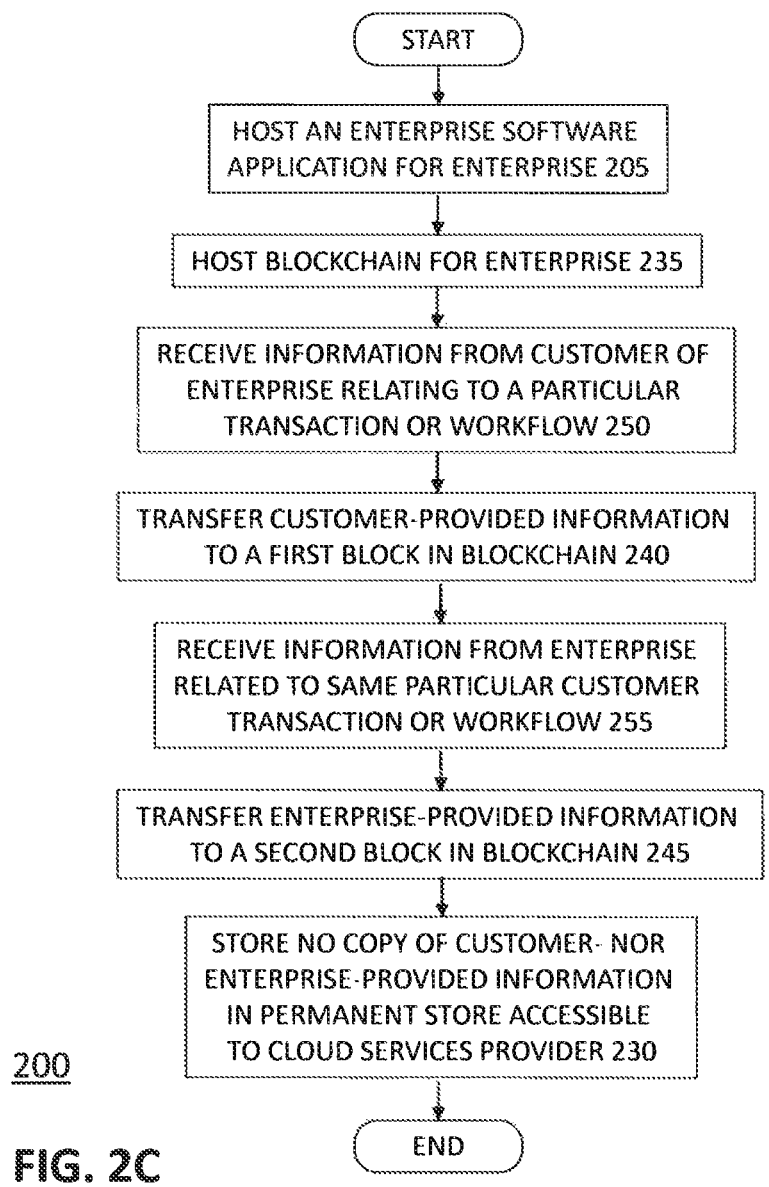
FIG. 2C depicts a flow diagram illustrating a method for implementing a distributed ledger technology method to isolate enterprise data from a cloud-based computing services provider that hosts a corresponding enterprise application software, in accordance with described embodiments.

According to another embodiment, with reference to the method 200 depicted at FIG. 2C, at block 205, processing logic is performed by a system in a host organization operated by a cloud computing services provider, or, alternatively, an application services provider. The system has at least a processor and a memory therein and hosts enterprise application software for an enterprise that is a customer of the cloud computing services provider.

At block 235, the third party services provider hosts a blockchain as a service for its customers, and at block 250, processing logic receives information input from a customer of the enterprise at a user interface for the enterprise application software, as described above with reference to block 210. However, in this embodiment, the information is identified as belonging to a particular workflow or transaction specific to the customer and his or her relationship with the enterprise. If this is the first information to be exchanged between the enterprise and the enterprise's customer, at block 240, the customer-provided information is transferred to a first block in the blockchain accessible to the system. In one embodiment, selected information provided by the customer is transferred to the first block in the blockchain, whereas other information need not be, depending on the nature and status of the information provided by the customer, just as described in the previous embodiments. Likewise, this information is not stored in a permanent store accessible to the third party services provider, such as the provider's cloud database(s), just as described in the previous embodiments.

Likewise, at block 255, processing logic receives information input from the enterprise at an enterprise interface for the enterprise application software, as described above with respect to block 220. However, in this embodiment, the information is identified as belonging to the same workflow or transaction specific to the customer and his or her relationship with the enterprise as the information identified above at block 250. For example, the information could be reply to a query made by the customer, or a query itself for more information from the customer. In any case, the enterprise-provided information is transferred to a second block in the same blockchain accessible to the system that was set up at block 235, and to which the customer-provided information was transferred at block 240, such that the blocks of information being exchanged between the enterprise and the customer relating to this particular workflow or transaction are chained together in the same blockchain. In one embodiment, selected information provided by the enterprise is transferred to the second block, whereas other information need not be, depending on the nature and status of the information provided by the enterprise, just as described above for previous embodiments. At block 230, this information, just like the customer-provided information, and just as described in the previous embodiments, is not stored in a permanent store accessible to a system or host organization operated by the third party services provider, such as the enterprise application software host provider's cloud database(s). In this manner, selected data exchanged between the enterprise and customer is securely isolated from the third party services provider nothwithstanding the third party services provider is hosting the enterprise application software, and hosting or providing access to the blockchain services required to maintain the information exchanged in the workflow or transaction as securely sealed off from access to all but the enterprise and the enterprise's customer.

Figure 2D:
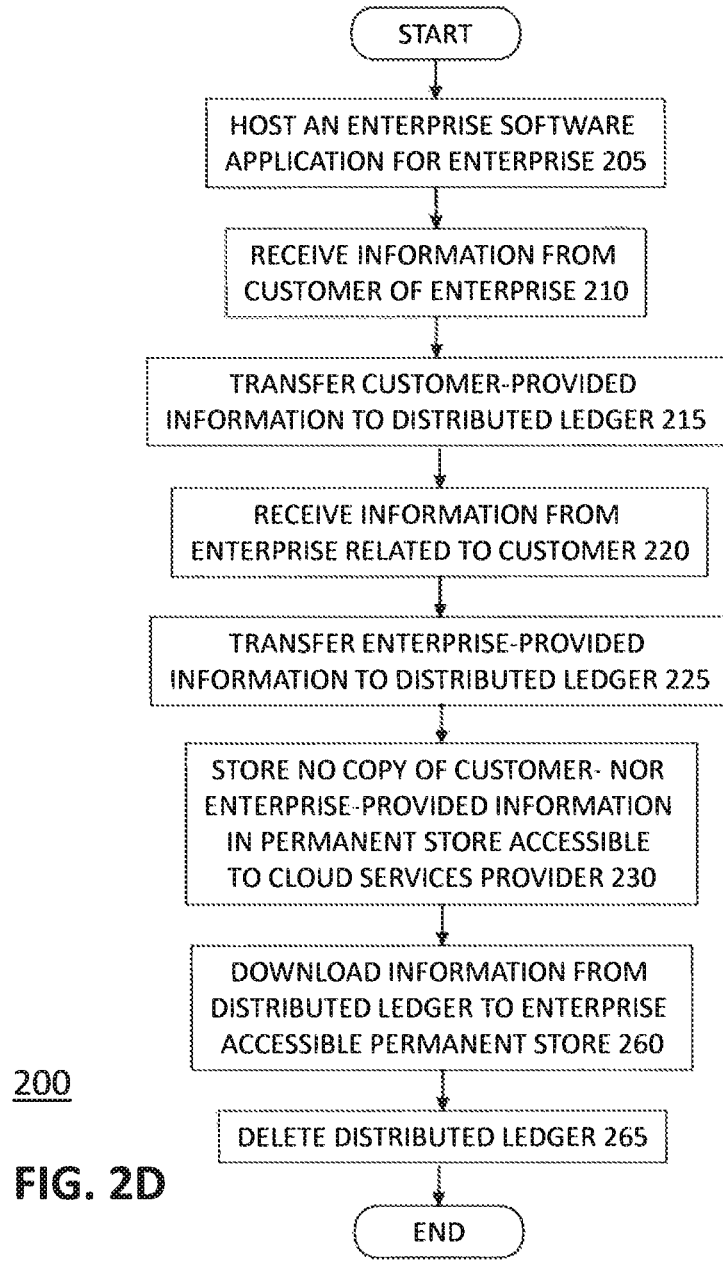
FIG. 2D depicts a flow diagram illustrating a method for implementing a distributed ledger technology method to isolate enterprise data from a cloud-based computing services provider that hosts a corresponding enterprise application software, in accordance with described embodiments.

According to yet another embodiment of the invention, with reference to the method 200 depicted at FIG. 2D, the embodiment is similar to the previous embodiments described above with respect to FIGS. 2A-2C, in terms of the input and transfer to a distributed ledger or blockchain, of information exchanged between the enterprise and the enterprise customer, for example, as described above at blocks 205-230 in FIG. 2A, but includes further, optional, processing logic at blocks 260 and 265. At block 260, selected information stored in the blockchain for the transaction or workflow may be downloaded by the enterprise to an on-premises database or other permanent store. The download could occur at any time once information is contained in one or more blocks in the blockchain. In one embodiment, once a transaction is complete, as determined by the enterprise and/or the customer, then at least some portion, or all, of the information related to the transaction or workflow contained in the blocks in the blockchain may be downloaded by and to the enterprise's on-premises databases so that its records are updated.

At block 265, once the transaction or workflow is complete, and once some or all of the information saved in the blockchain is optionally downloaded to the enterprise, the blockchain may be deleted by the block chain service provider at the direction of the enterprise, for example, to comply with data privacy laws or the like.

It should be noted that the blocks in flow diagrams discussed above illustrating a method for implementing isolation of information exchanged between an enterprise and a customer of the enterprise via an enterprise application software hosted by a cloud-based computing services provider can be executed in a different order without departing from the embodiments of the invention. For example, input received from the customer can occur after input received from the enterprise. Further, customer- and enterprise-provided information can be transferred to the same block, or to different blocks in the block chain, according to any sequence, after the information is received. Additionally, while the above flow diagrams depict receipt of information from the customer just once, and from the enterprise just once, it is understood that a workflow or transaction can involve multiple inputs from one or both of the customer and enterprise depending on the complexity of the workflow or transaction. In such case, multiple blocks in the blockchain can be added as information continues to be received from the customer and the enterprise over the course of the workflow or transaction.

While the embodiments described above contemplate information relating to a single transaction or workflow between the enterprise and the enterprise's customer being transferred and stored to a dedicated distributed ledger or blockchain, it is contemplated that information from multiple transactions or workflows, or portions thereof, between the enterprise and the enterprise's customer, may be transferred and stored to the dedicated distributed ledger or blockchain. Alternatively, information from multiple customers' transactions or workflows, or portions thereof, between the enterprise and the enterprises customers, may be transferred and stored to the same blockchain. Alternatively still, information from multiple customers' transactions or workflows, or portions thereof, between one or more enterprises and their repsective customers, may be transferred and stored to the same blockchain. One caution or possible disadvantage of doing so is that when needing or wanting to delete information from the blockchain relating to only one customer transaction, one customer, or one enterprise, or, more generally, when wanting to delete less than all the transactions in the blockchain, doing so may not be possible without having to recreate the blockchain without the blocks associated with the one customer transaction, one customer, one enterprise, or less than all the transactions in the blockchain.

To shield certain employees, agents, contractors, or departments within an organization or enterprise from viewing customer- or enterprise-provided information relating to a transaction or workflow, and to further shield the third party services provider hosting the enterprise application software from viewing the information, one embodiment contemplates encrypting the information either before or during input of the customer- or enterprise-provided information, and decrypting the information on or after output or download of the encrypted information. Alternatively, separate blockchains or access control to a single blockchain may be implemented so that only those that have a need to know the information being exchanged can access and view the contents of a particular blockchain.

Figure 3:
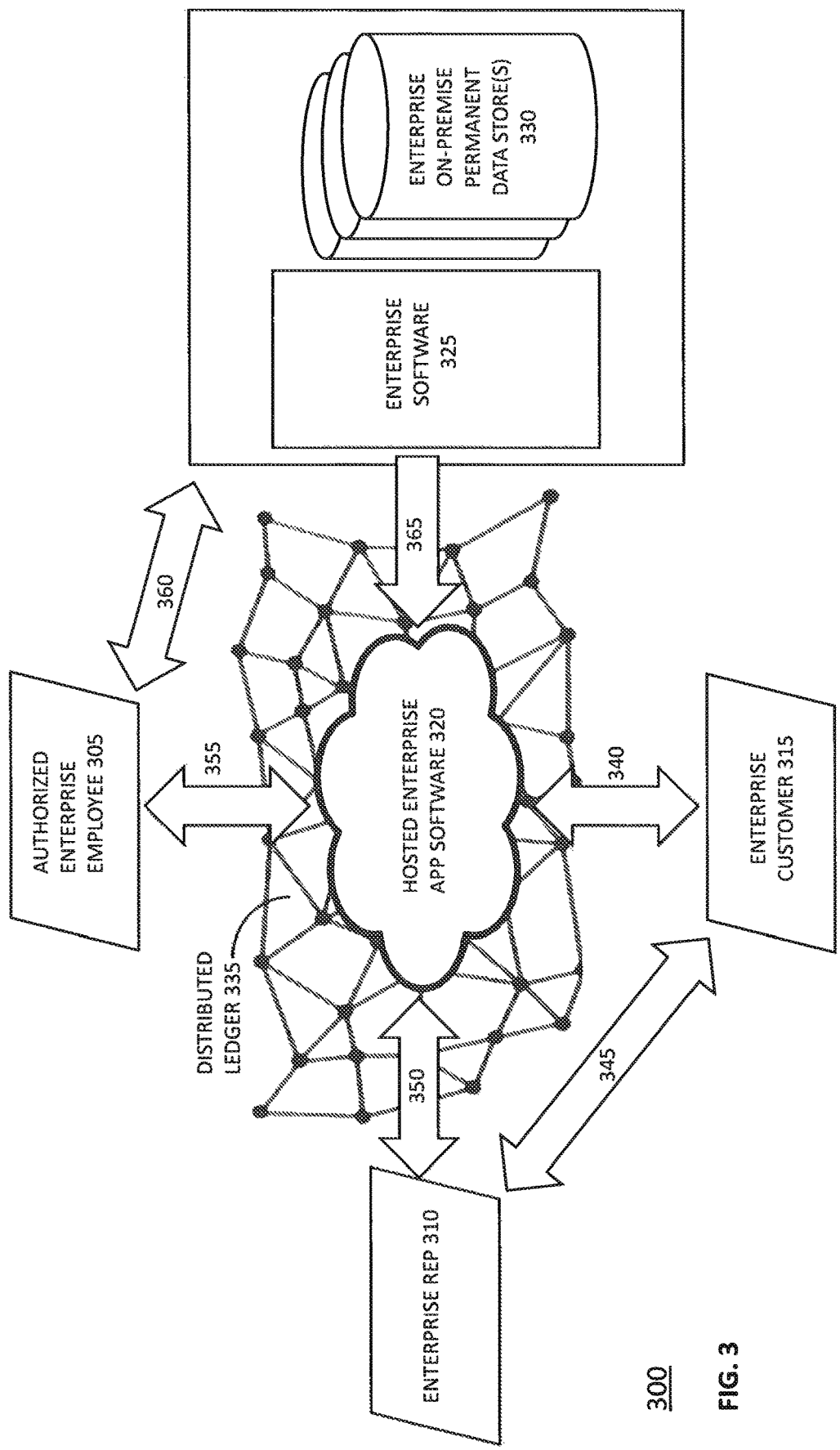
FIG. 3 illustrates a use case according to an embodiment of the invention.

With reference to FIG. 3, a use case for an embodiment of the invention 300 is described below. As seen in FIG. 3, an enterprise customer 315 can input customer information to enterprise application software (EAS) 320 hosted by a third party application services provider or cloud-based computing services provider. In one embodiment, the EAS is a CRM application hosted by the hosted by the third party application services provider or cloud-based computing services provider. The customer provided information is input, as depicted at 340, via a EAS web page displayed by a web browser executing on a client device at which the customer is located. The customer provided information is received, transferred and maintained in a distributed ledger 335, e.g., in a block in a blockchain, by the third party application services provider or cloud-based computing services provider. In one embodiment, the distributed ledger is set up when information relating to a new workflow or transaction between an enterprise and the enterprise's customer is first received. In one embodiment, the distributed ledger is set up and maintained by the third party cloud-based computing services provider. Alternatively, the distributed ledger is set up and maintained by a different service provider with which the third party cloud-based computing services provider communicates information to be stored and retrieved from the distributed ledger.

Alternatively, or additionally, an enterprise representative 310, e.g., a customer services representative or CRM representative, may provide some or all of the customer information to EAS 320 on behalf of an enterprise customer, for example, where the enterprise customer communicates outside the enterprise application with the enterprise representative 310, for example, via a instant message chat session or telephone call, as depicted at 345, which communication occurs outside the distributed ledger 335, as illustrated. The enterprise representative provided customer information is input, as depicted at 350, via an EAS web page displayed by a web browser executing on a client device at which the enterprise representative is located. The enterprise representative provided information is received, transferred and maintained in a distributed ledger 335, e.g., in a block in the blockchain, by the third party application services provider or cloud-based computing services provider.

Additionally, an enterprise employee 305 is authorized to receive the customer-provided information and provide enterprise information to the customer, whether in response to receipt of customer provided information (e.g., a query) and in reply thereto, or on its own initiative, for example, when an event or alert condition regarding the customer's account or profile is detected. The enterprise employee 305 may provide some or all of the enterprise information to EAS 320 on behalf of an enterprise, for example, where the enterprise communicates outside the enterprise application with the enterprise software 325, for example, via a communication channel, as depicted at 360, which communication occurs outside the distributed ledger 335, as illustrated. The enterprise provided information is input, as depicted at 355, via an EAS web page displayed by a web browser executing on a client device at which the enterprise employee is located. The enterprise provided information is received, transferred and maintained in a distributed ledger 335, e.g., in a block in the blockchain, by the third party application services provider or cloud-based computing services provider.

Alternatively, or additionally, the enterprise employee 305 is authorized to receive certain of the customer-provided information and provide certain enterprise information to the customer, whether in response to receipt of customer provided information (e.g., a query) and in reply thereto, or on its own initiative, for example, when an event or alert condition regarding the customer's account or profile is detected. In this manner the enterprise employee may be authorized to view and exchange certain information with the customer as compared to the enterprise representative, who may not be authorized to view some information relating to the customer or its relationship with the enterprise. For example, the enterprise representative 310 and the authorized enterprise employee may belong to different departments or divisions of the enterprise, and as such may have different access control privileges or authorization to view and exchange certain information with a customer. The enterprise employee 305 may provide some of the enterprise information to EAS 320 on behalf of an enterprise, for example, where the enterprise communicates outside the enterprise application with the enterprise software 325, for example, via the communication channel depicted at 360. Further certain information, for example, sensitive or confidential information about the customer or the enterprise, or sensitive or confidential information about the nature or status of the relationship between the enterprise and the customer, may only be provided to the customer directly from enterprise software 325 via the hosted enterprise application software 320. The enterprise provided information is input, as depicted at 365, via an API or the like between enterprise software 325 and EAS 320. The enterprise provided information is received, transferred and maintained in the distributed ledger 335, e.g., in a block in the blockchain, by the third party application services provider or cloud-based computing services provider.

In like manner, hosted EAS 320 may transmit to each of enterprise employee 305, enterprise representative 310, enterprise customer 315, and enterprise software 325, certain of the information stored in the distributed ledger, e.g., information stored in one or more blocks of the blockchain, as the case may be, depending on the enterprise application being hosted by the third party cloud-based computing services provider.

Figure 4A:
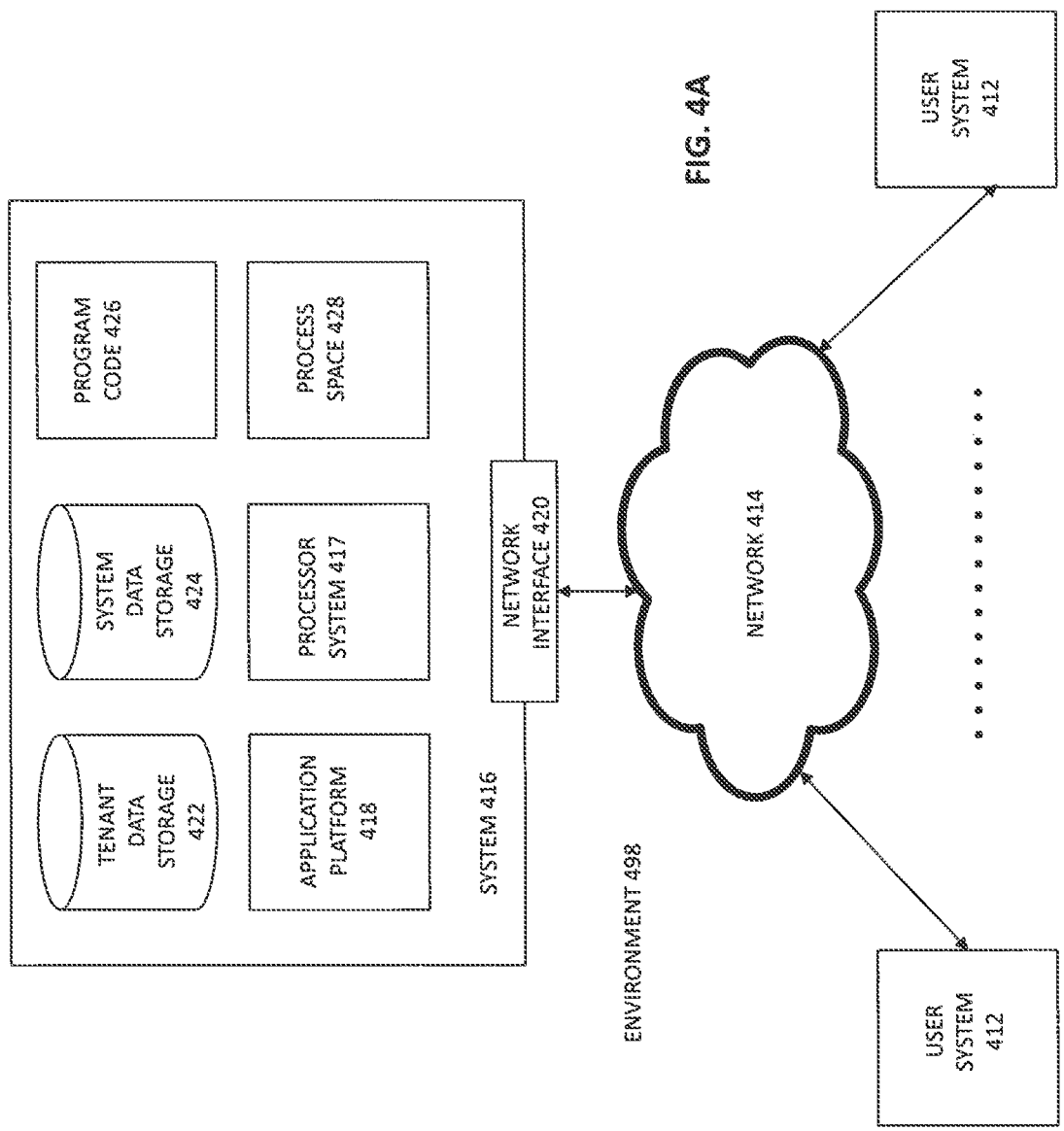
FIG. 4A illustrates a block diagram of an environment in which an on-demand database service may operate in accordance with the described embodiments.

FIG. 4A illustrates a block diagram of an environment 498 in which an on-demand database service may operate in accordance with the described embodiments. Environment 498 may include user systems 412, network 414, system 416, processor system 417, application platform 418, network interface 420, tenant data storage 422, system data storage 424, program code 426, and process space 428. In other embodiments, environment 498 may not have all of the components listed and/or may have other elements instead of, or in addition to, those listed above.

Environment 498 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4A (and in more detail in FIG. 4B) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" is used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4A, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4A, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4A include conventional, well-known elements that are explained only briefly here. For example, each user system 412 may include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units.

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4B:
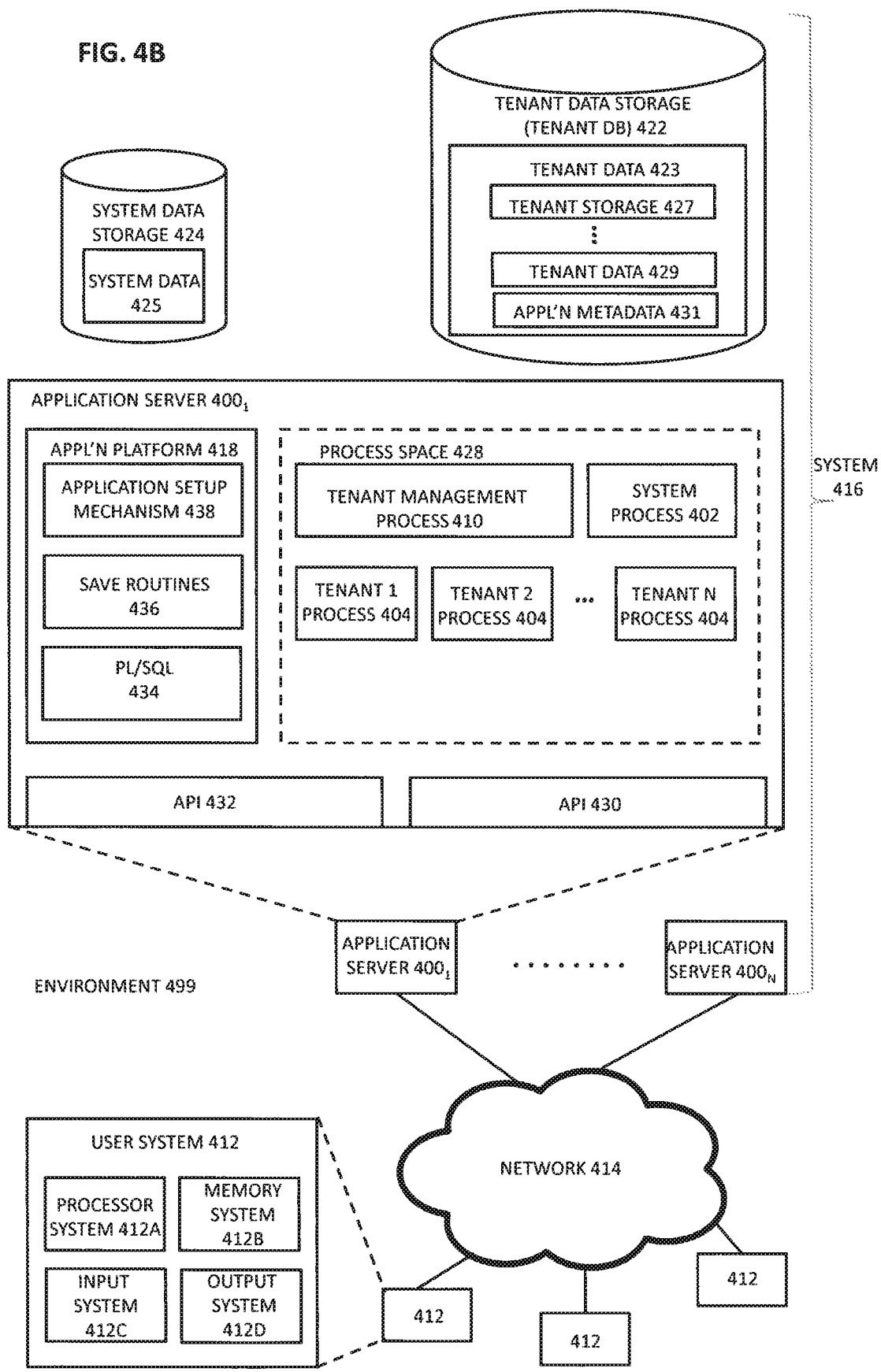
FIG. 4B illustrates another block diagram of an embodiment of elements of FIG. 4A and various possible interconnections between such elements in accordance with the described embodiments.

FIG. 4B illustrates another block diagram of an embodiment of elements of FIG. 4A and various possible interconnections between such elements in accordance with the described embodiments. FIG. 4B also illustrates environment 499. However, in FIG. 4B, the elements of system 416 and various interconnections in an embodiment are illustrated in further detail. More particularly, FIG. 4B shows that user system 412 may include a processor system 412A, memory system 412B, input system 412C, and output system 412D. FIG. 4B shows network 414 and system 416. FIG. 4B also shows that system 416 may include tenant data storage 422, having therein tenant data 423, which includes, for example, tenant storage space 427, tenant data 429, and application metadata 431. System data storage 424 is depicted as having therein system data 425. Further depicted within the expanded detail of application servers 4001-N are User Interface (UI) 430, Application Program Interface (API) 432, application platform 418 includes PL/SOQL 434, save routines 436, application setup mechanism 438, process space 428 includes system process space 402, tenant 1-N process spaces 404, and tenant management process space 410. In other embodiments, environment 499 may not have the same elements as those listed above and/or may have other elements instead of, or in addition to, those listed above.

User system 412, network 414, system 416, tenant data storage 422, and system data storage 424 were discussed above in FIG. 4A. As shown by FIG. 4B, system 416 may include a network interface 420 (of FIG. 4A) implemented as a set of HTTP application servers 400, an application platform 418, tenant data storage 422, and system data storage 424. Also shown is system process space 402, including individual tenant process spaces 404 and a tenant management process space 410. Each application server 400 may be configured to tenant data storage 422 and the tenant data 423 therein, and system data storage 424 and the system data 425 therein to serve requests of user systems 412. The tenant data 423 might be divided into individual tenant storage areas (e.g., tenant storage space 427), which can be either a physical arrangement and/or a logical arrangement of data. Within each tenant storage space 427, tenant data 429, and application metadata 431 might be similarly allocated for each user. For example, a copy of a user's most recently used (MRU) items might be stored to tenant data 429. Similarly, a copy of MRU items for an entire organization that is a tenant might be stored to tenant storage space 427. A UI 730 provides a user interface and an API 432 provides an application programmer interface into system 416 resident processes to users and/or developers at user systems 412. The tenant data and the system data may be stored in various databases, such as one or more Oracle™ databases.

Application platform 418 includes an application setup mechanism 438 that supports application developers' creation and management of applications, which may be saved as metadata into tenant data storage 422 by save routines 436 for execution by subscribers as one or more tenant process spaces 404 managed by tenant management process space 410 for example. Invocations to such applications may be coded using PL/SOQL 434 that provides a programming language style interface extension to API 432. Invocations to applications may be detected by one or more system processes, which manages retrieving application metadata 431 for the subscriber making the invocation and executing the metadata as an application in a virtual machine.

Each application server 400 may be communicably coupled to database systems, e.g., having access to system data 425 and tenant data 423, via a different network connection. For example, one application server $400_1$ might be coupled via the network 414 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 412 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user may hit three different application servers 400, and three requests from different users may hit the same application server 400. In this manner, system 416 is multitenant, in which system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 400 to request and update system-level and tenant-level data from system 416 that may require sending one or more queries to tenant data storage 422 and/or system data storage 424. System 416 (e.g., an application server 400 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-Specification tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a blockchain services interface 524 by which to interface tenants and users of the host organization with available supported blockchains, public or private. Main memory 504 also includes a blockchain consensus manager 523 and a block validator 525. Main memory 504 and its sub-elements are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display, etc.), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable storage medium or a non-transitory computer readable storage medium or a non-transitory machine-accessible storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

None of the claims herein are intended to invoke paragraph six of 35 U.S.C. § 112(f) unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method, performed by a system in a host organization operated by a cloud computing services provider, the system having at least a processor and a memory therein, wherein the method comprises:
    hosting, at an application server comprising a transaction type database, an enterprise application software for an enterprise;
    executing the enterprise application software at a process space of the system;
    providing a blockchain services interface to communicatively interface with hosting a private blockchain accessible to the system;
    receiving first input from a customer of the enterprise at a user interface for the enterprise application software, the first input comprising first data;
    determining that the first data is a first instance of information associated with a transaction or workflow;
    determining that the first data is to be committed to the private blockchain, wherein the determining that the first data is to be committed comprises accessing the transaction type database accessible to the host organization to determine that the first data is a first type comprising sensitive data to be committed to the private blockchain;
    determining, from consensus protocol data stored within the transaction type database, a first consensus protocol for the first type;
    transferring, based on determining that the first data is sensitive data, only the sensitive data of the first data to a first block, wherein the first data is not stored in permanent store accessible to the system and the host organization, wherein the transferring the sensitive data of the first data comprises achieving consensus by following the first consensus protocol;
    receiving second input from the enterprise at an enterprise interface for the enterprise application software, the second input comprising second data;
    determining that the second data is associated with the transaction or workflow;
    determining that the second data is to be committed to the private blockchain, wherein the determining that the second data is to be committed comprises accessing the transaction type database to determine that the second data is a second type comprising customer relationship management (CRM) data that is sensitive data to be committed to the private blockchain;
    determining, from the consensus protocol data stored within the transaction type database, a second consensus protocol for the second type;
    creating a prior hash for a second block to link the second block with the first block, the prior hash determined from data of the first block;
    transferring, based on determining that the second data is sensitive data, only the sensitive data comprising the CRM data of the second data to the second block, wherein the second data is not stored in permanent store accessible to the system and the host organization, wherein the transferring the sensitive data of the second data comprises achieving consensus by following the second consensus protocol; and
    providing the first data and the second data to be downloaded to an on-premises database of the enterprise.

2. The method of claim 1, further comprising hosting the private blockchain as a service for the enterprise.

3. The method of claim 1, wherein receiving first input from the customer of the enterprise at the user interface for the enterprise application software comprises receiving customer-provided information relating to a transaction or workflow between the customer and the enterprise; and wherein receiving second input from the enterprise at the enterprise interface for the enterprise application software comprises receiving enterprise-provided information relating to the transaction or the workflow between the customer and the enterprise.

4. The method of claim 3, wherein the on-premises database of the enterprise is inaccessible to the system and the host organization operated by the cloud computing services provider.

5. The method of claim 4, wherein the first data and the second data are downloaded to the on-premises database of the enterprise upon receiving notification of completion of the transaction or workflow from one of the enterprise via the enterprise interface or the customer via the user interface.

6. The method of claim 3, further comprising initiating deletion of the private blockchain upon receiving notification of completion of the transaction from the enterprise via the enterprise interface.

7. The method of claim 1,
    wherein receiving first input from the customer of the enterprise at the user interface for the enterprise application software comprises receiving encrypted information input from the customer;
    wherein transferring the first data to the first block comprises transferring the customer-provided encrypted information;
    wherein receiving second input from the enterprise at the enterprise interface for the enterprise application software comprises receiving encrypted information input from the enterprise; and wherein transferring the second data to the second block comprises transferring the enterprise provided encrypted information.

8. The method of claim 1, further comprising providing selected access for one or more of agents and departments of the enterprise to one or more of the customer-provided information, the enterprise-provided information, and the private blockchain to which the customer provided information and the enterprise- provided information is transferred.

9. Non-transitory computer readable storage media having instructions stored therein that, when executed by a system of a host organization operated by a cloud computing services provider, the system having at least a processor and a memory therein, the instructions cause the system to perform the following operations:
   hosting, at an application server comprising a transaction type database, an enterprise application software for an enterprise;
   executing the enterprise application software at a process space of the system;
   providing a blockchain services interface to communicatively interface with hosting a private blockchain accessible to the system;
   receiving first input from a customer of the enterprise at a user interface for the enterprise application software, the first input comprising first data; determining that the first data is a first instance of information associated with a transaction or workflow;
   determining that the first data is to be committed to the private blockchain, wherein the determining that the first data is to be committed comprises accessing a transaction type database accessible to the host organization to determine that the first data is a first type comprising sensitive data to be committed to the private blockchain;
   determining, from consensus protocol data stored within the transaction type database, a first consensus protocol for the first type;
   transferring, based on determining that the first data is sensitive data, only the sensitive data of the first data to a first block, wherein the first data is not stored in permanent store accessible to the system and the host organization, wherein the transferring the sensitive data of the first data comprises achieving consensus by following the first consensus protocol;
   receiving second input from the enterprise at an enterprise interface for the enterprise application software, the second input comprising second data;
   determining that the second data is associated with the transaction or workflow;
   determining that the second data is to be committed to the private blockchain, wherein the determining that the second data is to be committed comprises accessing the transaction type database to determine that the second data is a second type comprising customer relationship management (CRM) data that is sensitive data to be committed to the private blockchain;
   determining, from the consensus protocol data stored within the transaction type database, a second consensus protocol for the second type;
   creating a prior hash for a second block to link the second block with the first block, the prior hash determined from data of the first block;
   transferring, based on determining that the second data is sensitive data, only the sensitive data comprising the CRM data of the second data to the second block, wherein the second data is not stored in permanent store accessible to the system and the host organization, wherein the transferring the sensitive data of the second data comprises achieving consensus by following the second consensus protocol; and
   providing the first data and the second data to be downloaded to an on-premises database of the enterprise.

10. The non-transitory computer readable storage media of claim 9, the operations further comprising: hosting the private blockchain as a service for the enterprise.

11. The non-transitory computer readable storage media of claim 9,
   wherein receiving first input from the customer of the enterprise at the user interface for the enterprise application software comprises receiving customer-provided information relating to a transaction or workflow between the customer and the enterprise; and
   wherein receiving second input from the enterprise at the enterprise interface for the enterprise application software comprises receiving enterprise-provided information relating to the transaction or the workflow between the customer and the enterprise.

12. The non-transitory computer readable storage media of claim 11, wherein the on-premises database of the enterprise is inaccessible to the system and the host organization operated by the cloud computing services provider.

13. The non-transitory computer readable storage media of claim 12, wherein the first data and the second data are downloaded to the on-premises database of the enterprise upon receiving notification of completion of the transaction or workflow from one of the enterprise via the enterprise interface or the customer via the user interface.

14. The non-transitory computer readable storage media of claim 11, the operations further comprising: initiating deletion of the private blockchain upon receiving notification of completion of the transaction from the enterprise via the enterprise interface.

15. The non-transitory computer readable storage media of claim 9,
   wherein receiving first input from the customer of the enterprise at the user interface for the enterprise application software comprises receiving encrypted information input from the customer;
   wherein transferring the first data to the first block comprises transferring the customer-provided encrypted information;
   wherein receiving second input from the enterprise at the enterprise interface for the enterprise application software comprises receiving encrypted information input from the enterprise; and
   wherein transferring the second data to the second block comprises transferring the enterprise provided encrypted information.

16. The non-transitory computer readable storage media of claim 9, the operations further comprising: providing selected access for one or more of agents and departments of the enterprise to one or more of the customer-provided information, the enterprise-provided information, and the private blockchain to which the customer-provided information and the enterprise-provided information is transferred.

17. A system to execute at a host organization operated by a cloud computing services provider, wherein the system comprises:
   an application server comprising a transaction type database;

a memory to store instructions; and
a processor to execute instructions:
wherein the processor is to execute the instructions to cause the system to:
host, at the application server, an enterprise application software for an enterprise;
execute the enterprise application software at a process space of the system;
provide a blockchain services interface to communicatively interface with a private blockchain accessible to the system;
receive first input from a customer of the enterprise at a user interface for the enterprise application software, the first input comprising first data;
determine that the first data is a first instance of information associated with a transaction or workflow;
determine that the first data is to be committed to the private blockchain, wherein the determining that the first data is to be committed comprises accessing a transaction type database accessible to the host organization to determine that the first data is a first type comprising sensitive data to be committed to the private blockchain;
determine, from consensus protocol data stored within the transaction type database, a first consensus protocol for the first type;
transfer, based on determining that the first data is sensitive data, only the sensitive data of the first data to a first block, wherein the first data is not stored in permanent store accessible to the system and the host organization, wherein the transferring the sensitive data of the first data comprises achieving consensus by following the first consensus protocol;
receive second input from the enterprise at an enterprise interface for the enterprise application software, the second input comprising second data;
determine that the second data is associated with the transaction or workflow;
determine that the second data is to be committed to the private blockchain, wherein the determining that the second data is to be committed comprises accessing the transaction type database to determine that the second data is a second type comprising customer relationship management (CRM) data that is sensitive data to be committed to the private blockchain;
determine, from the consensus protocol data stored within the transaction type database, a second consensus protocol for the second type;
create a prior hash for a second block to link the second block with the first block, the prior hash determined from data of the first block;
transfer, based on determining that the second data is sensitive data, only the sensitive data comprising the CRM data of the second data to the second block, wherein the second data is not stored in permanent store accessible to the system and the host organization, wherein the transferring the sensitive data of the second data comprises achieving consensus by following the second consensus protocol; and
provide the first data and the second data to be downloaded to an on-premises database of the enterprise.

18. The system of claim 17, further comprising instructions that cause the system to host the private blockchain as a service for the enterprise.

19. The system of claim 17,
wherein the instructions that cause the system to receive first input from the customer of the enterprise at the user interface for the enterprise application software comprise instructions to receive customer-provided information relating to a transaction or workflow between the customer and the enterprise; and
wherein the instructions that cause the system to receive second input from the enterprise at the enterprise interface for the enterprise application software comprise instructions to receive enterprise provided information relating to the transaction or the workflow between the customer and the enterprise.

20. The system of claim 19, wherein the on-premises database of the enterprise is inaccessible to the system and the host organization operated by the cloud computing services provider.

21. The system of claim 20, wherein the first data and the second data are downloaded to the on-premises database of the enterprise upon receiving notification of completion of the transaction or workflow from one of the enterprise via the enterprise interface or the customer via the user interface.

22. The system of claim 19, further comprising instructions that cause the system to initiate deletion of the private blockchain upon receiving notification of completion of the transaction from the enterprise via the enterprise interface.

23. The system of claim 17,
wherein the instructions that cause the system to receive first input from the customer of the enterprise at the user interface for the enterprise application software comprise instructions to receive encrypted information input from the customer;
wherein the instructions that cause the system to transfer the first data to the first block comprise instructions to transfer the customer-provided encrypted information;
wherein the instructions that cause the system to receive second input from the enterprise at the enterprise interface for the enterprise application software comprise instructions to receive encrypted information input from the enterprise; and
wherein the instructions that cause the system to transfer the second data to the second block comprise instructions to transfer the enterprise-provided encrypted information.

24. The system of claim 17, further comprising the instructions that cause the system to provide selected access for one or more of agents and departments of the enterprise to one or more of the customer-provided information, the enterprise-provided information, and the private blockchain to which the customer-provided information and the enterprise provided information is transferred.

* * * * *